United States Patent [19]

Gyugyi et al.

[11] 4,204,151

[45] May 20, 1980

[54] STATIC VAR GENERATOR WITH NON-LINEAR FREQUENCY DEPENDENT DYNAMIC GAIN ADJUSTER

[75] Inventors: Laszlo Gyugyi, Penn Hills; Michael B. Brennen, Wilkins Township, Allegheny County, both of Pa.

[73] Assignee: Westinghouse Electric Corp., Pittsburgh, Pa.

[21] Appl. No.: 892,805

[22] Filed: Apr. 3, 1978

[51] Int. Cl.² .............................................. H02J 3/18
[52] U.S. Cl. .................................................. 323/119
[58] Field of Search ............... 323/101, 102, 106, 108, 323/109, 110, 119, 124, 127, 128; 13/12, 13; 219/108, 110, 112, 113, 114, 115, 131 R

[56] References Cited

U.S. PATENT DOCUMENTS

| | | | |
|---|---|---|---|
| 3,936,727 | 2/1976 | Kelly, Jr. et al. | 323/102 |
| 3,940,687 | 2/1976 | Akhundov | 323/101 |
| 3,987,359 | 10/1976 | Thompson | 323/119 |
| 3,999,117 | 12/1976 | Gyugyi et al. | 323/119 |
| 4,068,159 | 1/1978 | Gyugyi | 323/119 |

*Primary Examiner*—William M. Shoop
*Attorney, Agent, or Firm*—M. J. Moran

[57] ABSTRACT

A control circuit for a static VAR generator measures appropriate circuit current and voltage during consecutive half cycles. This information is utilized to determine the firing angles of the VAR generator thyristors for providing compensating current to the line for keeping line current in phase with line voltage and for balancing the line currents in three phase electrical systems. A non-linear frequency dependent dynamic gain adjuster is provided in the control system of the VAR generator to automatically and rapidly reduce the gain of the VAR generator circuit as the frequency of load disturbance exceeds the VAR generator frequency response range.

11 Claims, 11 Drawing Figures

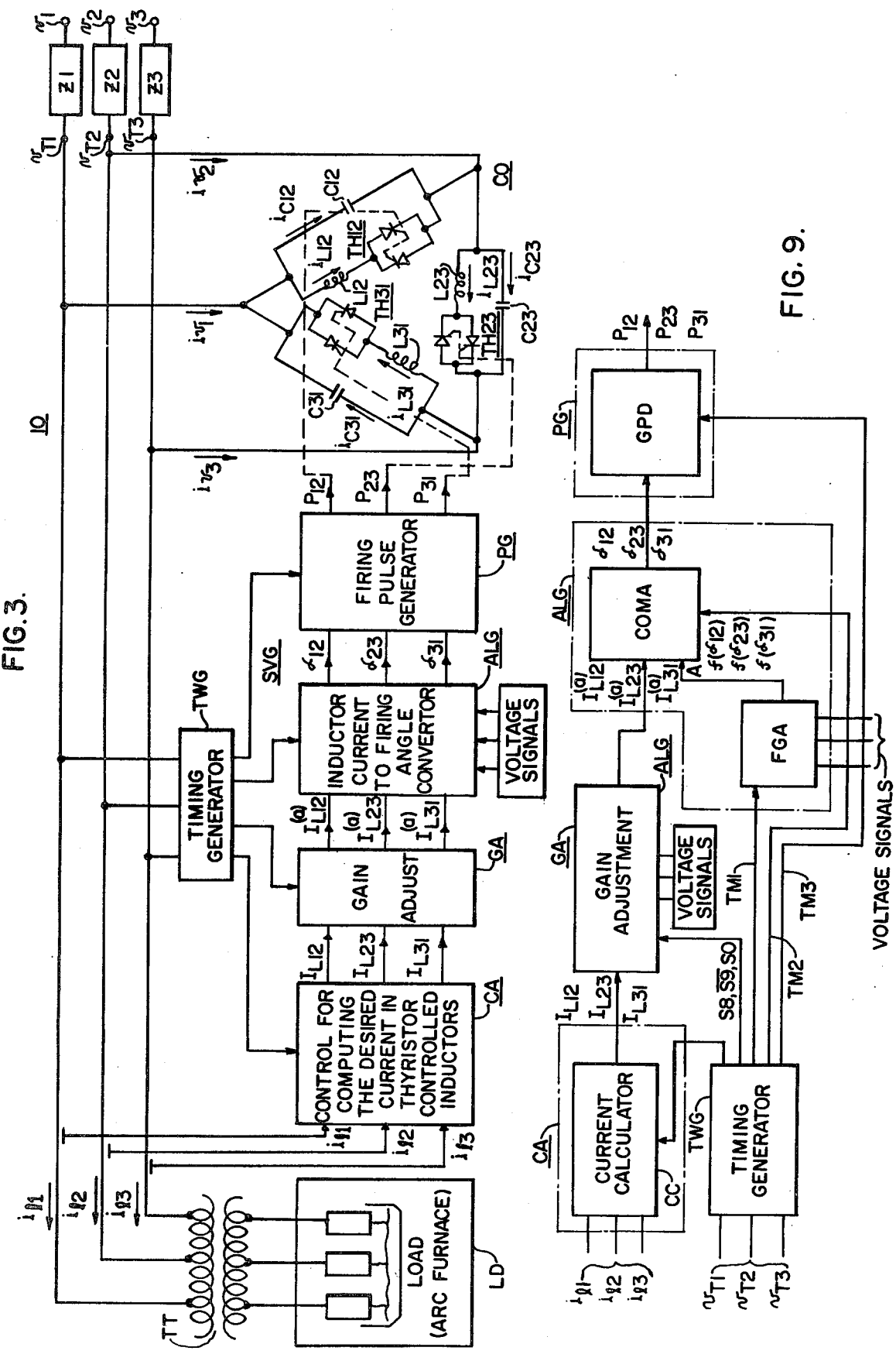

STATIC VAR GENERATOR WITH NON-LINEAR FREQUENCY DEPENDENT DYNAMIC GAIN ADJUSTER

CROSS-REFERENCE TO RELATED APPLICATIONS

The subject matter of this invention is related to certain other inventions described in concurrently filed copending applications: Ser. No. 892,804, entitled "Static VAR Generator With Time-Related Error Minimizer"; and Ser. No. 892,556, entitled "Voltage Regulator And Flicker Compensator".

BACKGROUND OF THE INVENTION

This invention relates generally to VAR generators and it relates in particular to automatic non-linear frequency dependent dynamic gain adjusters for the control systems of VAR generators.

Static VAR generators compensate for the effects of highly reactive loads, such as arc furnaces, on the terminal variables of an AC supply system. The static VAR generator or flicker compensator as it is sometimes called, includes a control circuit which measures the magnitudes of the arc furnace currents in consecutive half cycles of the line or supply voltage. The measured information is used to compute necessary compensating currents in terms of required firing angle signals for the thyristors of the static VAR generator. The static VAR generator output can only be adjusted once during each half cycle per phase. Generally, prior art concerning static VAR generators is directed towards apparatus and method for determining the proper firing angle for the inductor which controls thyristors of the VAR generator. The trend in the prior art seems to be in a direction from apparatus associated with the determination of the firing angle by any means whatsoever towards determining the firing angle at a point in time as close as possible to the actual firing of the thyristors. Examples of that trend can be found in U.S. Pat. No. 3,936,727 issued Feb. 3, 1976 to F. W. Kelly, Jr. and G. R. E. Lezan which teaches a compensation control device which determines firing time for a static switch in accordance with the magnitude of the reactive load current and which additionally teaches a regulating means which controls the firing time to maintain the line current and line voltage (at a selected line location) in substantial phase coincidence. U.S. Pat. No. 3,999,117 issued Dec. 21, 1976 to Gyugyi et al teaches a static VAR generator and compensator where time delayed firing angles are calculated by integrating furnace load currents over predescribed intervals during real time to thus maintain balanced load current at specified phase angles—relative to phase voltage—which are usually zero for a three-phase electrical system. In a later patent, U.S. Pat. No. 4,000,455 issued Dec. 28, 1976 to Gyugyi, it is taught that the total computation time for determining the firing angle in each succeeding half cycle will take no longer than the length of time of the last complete half cycle (measured at voltage peak) immediately prior to the firing of the thyristor. In U.S. Pat. No. 4,068,150 by Gyugyi et al, it is determined that the computation time for determining the firing angle can actually extend into the half cycle in which correction is to be applied. In copending Application Ser. No. 880,270 also by Gyugyi et al, the computation time for determining the firing angle is extended even further into the half cycle in which correction is to be applied.

It has been noted, however, that the accurate reliable timely determination of firing angle from circuit variables becomes less significant if the transport or delay time of the control system through which this information must be propagated—from initial sensing to application of thyristor firing control—is too large to allow the control system to respond to frequency of the load disturbance for which the VAR generator is provided to correct. The control system for the VAR generator must have a high gain in the frequency band where the VAR generator is capable of providing effective compensation against load disturbances. On the other hand, however, the gain of the control should be low at higher frequencies at which the VAR generator cannot follow the load variation, in order to eliminate the possibility that the VAR generator itself produces voltage variation. This can happen when the VAR generator, due to its own inherent time delay or transport time gets so far out of step that it provides reactive volt amps (VARS) which tend to reinforce rather than reduce the reactive variation of the load. It would be desirable, therefore, to provide a VAR generator having a control system where reduction of the control system gain is provided for high frequency disturbances of large magnitude.

SUMMARY OF THE INVENTION

In accordance with the invention, apparatus is taught for rapidly reducing the gain of the VAR generator control system in a situation where there are line disturbances caused by load or generation variation. In the present case the frequencies of the aforementioned disturbances exceed the limit beyond which effective compensation by the VAR generator cannot be provided. It has been found that since the time delay between measurement of system variables and compensation therefore by a VAR generator is an inherent property of the thyristor controlled inductor type VAR generator, the VAR generator's ability to compensate disturbances with a relatively high repetition rate cannot be improved beyond a certain limit. In order to insure that the VAR generator will not aggravate the load disturbances above this limit a frequency (rate of change) dependent gain adjustment in the control system for the VAR generator is provided. Ideally the gain of the control system should be as high as required for perfect compensation in the frequency range in which the VAR generator is effective in reducing disturbances, and, conversely, the gain should be rapidly decreased as the frequency of the disturbances exceeds the VAR generator's useful operating frequency range. In other words, the overall gain of the VAR generator should be a non-linear function of frequency. This is particularly important where disturbances of large magnitude are encountered. Therefore, the present invention teaches, among other things, a VAR generator of the type which is connected across at least two conductors of an electrical system for the purpose of supplying reactive power to that system. The VAR generator comprises a calculating means for determining an apparent amount of reactive power that is to be provided to the electrical system during a given period of time for accomplishing a given purpose and for providing an apparent reactive power output signal related thereto. A gain adjust means is provided which is connected to receive the apparent reactive power output signal for adjusting the apparent reactive power output signal to provide a gain adjusted output signal which is related to the actual amount of reactive power which is to be delivered to the electrical system during the previously described time period. The gain adjusted output signal is related to the difference between the apparent reactive power output signal and a stored value of the actual amount of delivered reactive power which had been provided to the system during a previous time period. Finally, a reactive power producing means such as a thyristor-controlled-inductor connected in parallel circuit relationship with a fixed capacitor is connected to the conductors of the electrical system and to the gain adjust means for providing the actual amount of reactive power as corrected in the gain adjust means to the system during the time period.

BRIEF DESCRIPTION OF THE DRAWINGS

For a better understanding of the invention, reference may be made to the preferred embodiments thereof shown by the accompanying drawings in which:

FIG. 3 shows a static VAR generator control system having a gain adjustment module as a part thereof;

FIG. 9 shows a portion of the control system of FIG. 3 where the block diagrams shown therein are separated into component modules;

DESCRIPTION OF THE PREFERRED EMBODIMENT

Figure 1:
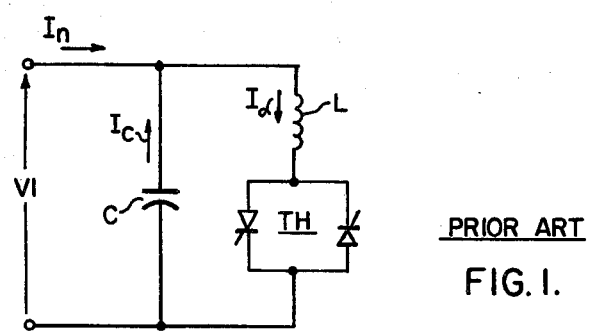
FIG. 1 shows a prior art static VAR generator power circuit.

Referring now to the drawings and prior art FIG. 1 in particular, there is shown a basic VAR generator for a single phase AC electrical system. In general, the VAR generator consists of a fixed capacitor C and a thyristor controlled inductor L. At zero leading VAR demand, the thyristor switch TH is closed and the inductive effect of the inductor L cancels the capacitive effect of the capacitor C so that the net current $I_n$ provided for the AC system is zero. That is, the algebraic sum of the capacitor current $I_c$ and the inductor current $I_\alpha$ is equal to zero. The voltage across the parallel combination which includes the capacitive element C, the inductive element L and the thyristor switch TH is equal to V1. At some non-zero leading VAR demand, the closing of the switch TH is appropriately delayed in each half cycle of the alternating current by a variable angle which shall be called the firing angle $\alpha$ which is measured with respect to the peak of the supply voltage V1 in order to reduce the current $I_\alpha$ flowing in the inductor L.

Figure 2:
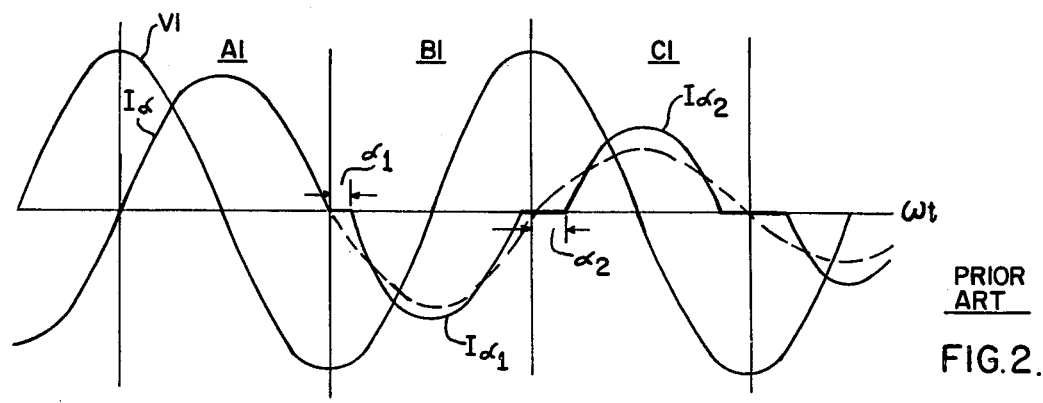
FIG. 2 shows a plot of VAR generator voltage and time controlled inductor current versus $\omega t$ for the apparatus of FIG. 1.

Referring now to FIG. 2, there is shown a plot of voltage V1 and current $I_\alpha$ versus $\omega t$. The curves of FIG. 2 are arbitrarily divided into three zones designated A1, B1, and C1, each of which begins with the maximum positive or negative value of V1 in each half cycle as the case may be. It will be noted that in region A1, the inductor current $I_\alpha$ lags the inductor voltage V1 by 90° and the firing angle $\alpha$ is zero. However, with an increasing firing angle $\alpha$ in the region between zero and 90°, the inductive current $I_\alpha$ decreases and consequently, the leading VAR provided for the AC system increases. At the maximum leading VAR demand, the switch TH of FIG. 1 is fully opened. This occurs at $\alpha = 90°$. When this happens, the current $I_\alpha$ in the inductor L in FIG. 1 is zero and therefore, the maximum rated capacitive current $I_c$ is provided for compensation. FIG. 2 shows in region B1 that for a delay or firing angle $\alpha_1$, the inductive current $I_{\alpha 1}$ flows for a shorter period of time than the current $I_\alpha$ shown in region A1. Likewise, in region C1 where the firing angle or delay is $\alpha_2$ (where $\alpha_2$ is greater than $\alpha_1$ in this case), the inductor current $I_{\alpha 2}$ flows for an even shorter period of time than those inductive currents $I_\alpha$ and $I_{\alpha 1}$ shown in regions A1 and B1, respectively.

Referring now to FIG. 3, an electrical system 10 is shown. Electrical system 10 may be of the type normally associated with the three-phase transmission or distribution of electrical power. In the most likely case it is associated with the distribution of electrical power but is not limited thereto. System 10 may comprise three-phase source voltages $v_1$, $v_2$ and $v_3$ flowing through electrical lines represented by impedances Z1, Z2 and Z3 respectively to produce terminal voltages $V_{T1}$, $V_{T2}$, and $V_{T3}$ respectively at the control terminals of a static VAR generator SVG. Electrical system 10 may be of the type which supplies electrical power to a load LD such as an arc furnace through a transformer TT or the like. Line currents $i_{l1}$, $i_{l2}$ and $i_{l3}$ may flow in the three conductors previously described. In order to provide static VAR compensation, the line currents are sensed by a calculator module CA. Calculator CA may be otherwise described as a control for computing the desired currents in thyristor controlled inductors. The latter currents, generally designated $I_{L12}$, $I_{L23}$ and $I_{L31}$ are provided to a gain adjuster GA. The gain adjuster GA performs a desirable function to be described hereinafter, by operating on the previously described computed currents $I_{L12}$, $I_{L23}$ and $I_{L31}$ to produce gain adjuster output applied currents $I_{L12}^{(\alpha)}$, $I_{L23}^{(\alpha)}$, $I_{L31}^{(\alpha)}$ respectively. These applied currents are provided to an inductor-current-to-firing angle converter ALG where the applied currents are converted to firing angles $\alpha_{12}$, $\alpha_{23}$ and $\alpha_{31}$, respectively. These firing angle signals are then provided to a firing pulse generator PG where they are converted to firing pulses $P_{12}$, $P_{23}$ and $P_{31}$ respectively. The firing pulses $P_{12}$, $P_{23}$ and $P_{31}$ are supplied to thyristor sets $TH_{12}$, $TH_{23}$ and $TH_{31}$ respectively of a compensator CO. The operation of the compensator CO has been described previously with respect to U.S. Pat. No. 3,999,117, but will be repeated herein for purposes of clarity of illustration. In essence, the compensator may comprise a three-phase delta connected current control system having VAR generator control currents $i_{v1}$, $i_{v2}$ and $i_{v3}$ flowing between the delta connected nodes of the compensator CO and the lines of the electrical system 10. Current $i_{v1}$ may flow to the line upon which terminal voltage $v_{T1}$ is impressed and so on. The compensator is made of three delta-connected parallel branches. The first set of parallel branches includes a fixed inductor L12 connected in series circuit relationship with a thyristor set TH12. The series combination of the inductor L12 and the thyristor set TH12 is connected in parallel circuit relationship with a fixed capacitor C12. Capacitive current $i_{C12}$ flows through the capacitive element C12 as a function of the potential difference at any time between the terminal voltages $v_{T1}$ and $v_{T2}$. Phase shifted inductor current $i_{L12}$ attempts to flow in the inductor L12 as a result of the potential difference between the two previously described voltages. However, the amount of current actually allowed to flow in any one-half cycle is controlled by the firing duration of the thyristor set TH12. If the inductor current $i_{L12}$ is allowed to flow at its full magnitude or at a desired predetermined value for an entire half cycle, it may sufficiently cancel the 180° phase shifted capacitive current to thus provide no reactive compensation to the phase represented by the terminal voltage $v_{T1}$ and $v_{T2}$. However, if the inductor current is appropriately phased back by changing the firing angle ($\alpha$) on the thyristor set TH12, the amount of inductor current $i_{L12}$ for cancelling capacitive current $I_{C12}$ is reduced thus increasing the component of reactive current available between the two previously described phase lines during any half cycle. The other two delta legs of the compensator operate similarly. As an example, there is provided a fixed capacitor C23 which is connected in parallel with the series combination of a fixed inductor L23 and a thyristor set TH23. Capacitive current $i_{C23}$ and inductive current $i_{L23}$ cooperate to form a net compensating current in correspondence with the firing angle of the thyristor switch. The last parallel combination includes the capacitive element C31 connected in parallel with the series combination of the inductive element L31 in the thyristor set TH31. Current $i_{C31}$ and oppositely directed current $i_{L31}$ flow in the capacitive and inductive branches respectively and cooperate to form the net reactive component of current for the main electrical system between the phases represented by the terminal voltages $v_{T3}$ and $v_{T1}$. Once again this is in correspondence to the firing angle of the thyristor set TH31.

The basic principles of the frequency dependent gain control are explained with reference to FIG. 3. The explanation is pertinent to phase 1-2 with the understanding that the same principles are applicable to phases 2-3 and 3-1 also.

In the normal process of VAR generator control, the desired inductor current $I_{L12}$ is determined (computed) from the available terminal quantities (load currents and terminal voltages) in each half cycle just prior to the beginning of the successive firing interval. (The firing interval begins at the peak of the line-to-line voltage, $v_{12}$, and ends 90 electrical degrees later). The desired peak inductor current, $I_{L12}$ is subsequently converted into the firing angle, $\alpha_{12}$, required to establish this current in the thyristor controlled inductor L12.

The apparatus of the system SVG detects the magnitude of change between the previously applied inductor current and the presently computed (desired) one, and limits, in a non-linear manner, the magnitude differential between two successively applied inductor currents.

Assume that in the previous, $k-1$, half cycle, inductor current with the desired magnitude of $I_{L12,(k-1)}^{(a)}$, was established by providing a firing pulse with a firing angle of $\alpha_{12,(k-1)}$ for thyristor TH12. Assume further that a signal representing current $I_{L12,(k-1)}^{(a)}$, was stored in an electronic storage unit before the computation of the new desired inductor current has begun in the kth half cycle. (Superscript (a) is used to discriminate "applied" quantities from "computed" ones). Suppose the new magnitude of the desired indicator current computed in the kth half cycle is $I_{L12,k}$. Instead of converting the computed (desired) inductor current, $I_{L12,k}$, into firing angle $\alpha_{12,k}$, a quantity that will represent the new applied inductor current is derived in the following way:

First, a normalized difference between the previously applied and presently computed inductor currents is established $$\Delta I_{L12,k} = \frac{I_{L12,(k-1)}^{(a)} - I_{L12,k}}{I_{L12,max}} \tag{1}$$

where $I_{L12,max}$ is the maximum current the inductor L12 may control with the minimum operating firing angle $\alpha_{12\ min}$, i.e. $\alpha_{12\ min}$ may be assumed zero in the present discussion.

Second, the following non-linear function is generated $$f(n) = |\Delta I_{L12,k}|^n \tag{2}$$

Figure 4:
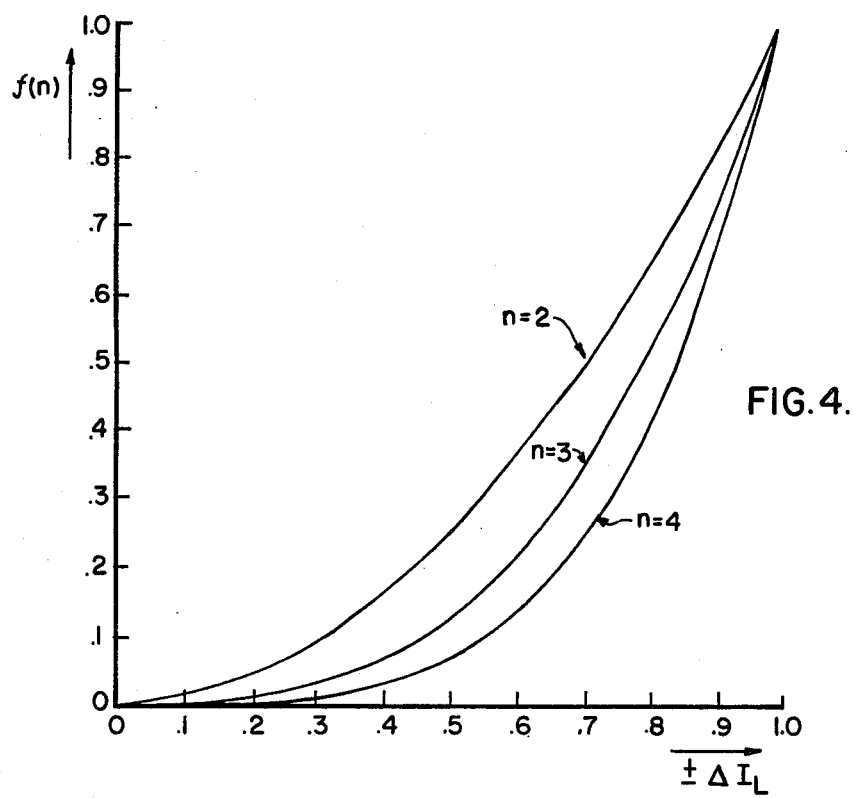
FIG. 4 shows a plot of a function of n versus the change in inductor current, where n is equal to 2, 3 or 4.

The vertical bars represent the absolute value of $\Delta I_{L12,k}$, and n is an integer greater than one, (n>1). Function f(n) is plotted for different values of the exponent n in FIG. 4.

Finally, a new desired inductor current that will actually be applied in the kth cycle is computed by the equation:

$$i_{L12,k}^{(a)} = I_{L12,k} + \text{SIGN}(\Delta I_{L12,k}) cf(n) I_{L12,max} \tag{3}$$

where SIGN ($\Delta I_{L12,k}$) represents the sign (polarity) of $\Delta I_{L12,k}$, that is SIGN ($\Delta I_{L12,k}$)=1 if $\Delta I_{L12,k}>0$, and SIGN ($\Delta I_{L12,k}$)= −1 if $\Delta I_{L12,k}<0$.

c is a constant in the range $0 \leq c \leq 1.0$, and f(n) is defined by equation (2).

As can be seen in equation (3), a corrective term is added to (or subtracted from) the computed desired current. This corrective term is proportional to the nth power of the difference between the previously applied and presently computed desired inductor currents. Consequently, the corrective term rapidly increases with the rate of change of desired inductor current. (The rate of change of desired inductor current indicates, of course, the rate of change of load disturbance). The sign of the corrective term is such as to oppose large rapid changes in the VAR generator output. Thus, in effect, the gain of the VAR generator becomes a non-linear function of the rate of change of load disturbance. The magnitude and non-linearity of the corrective term, and thereby the character of the VAR generator gain, are set by coefficient c and exponent n. In practice, c is usually between 0.3–0.7 and n is usually 2, 3 or 4.

Figure 5:
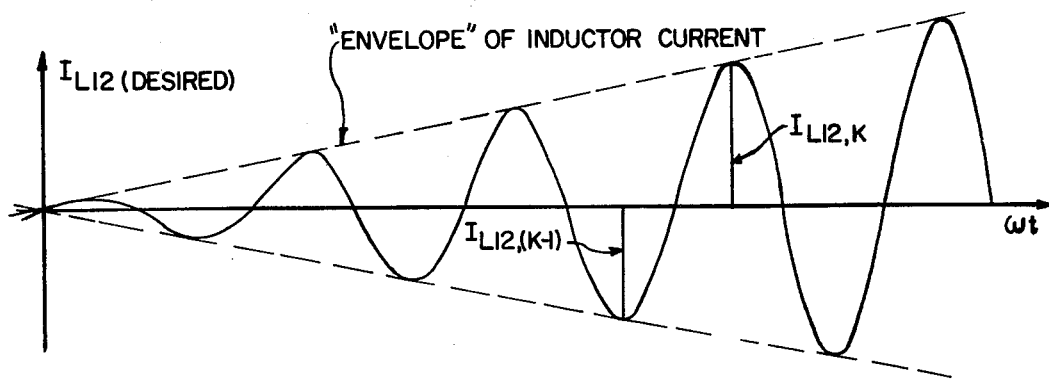
FIG. 5 shows a plot of desire inductor current versus $\omega t$ for relatively slow load disturbances.
Figure 6:
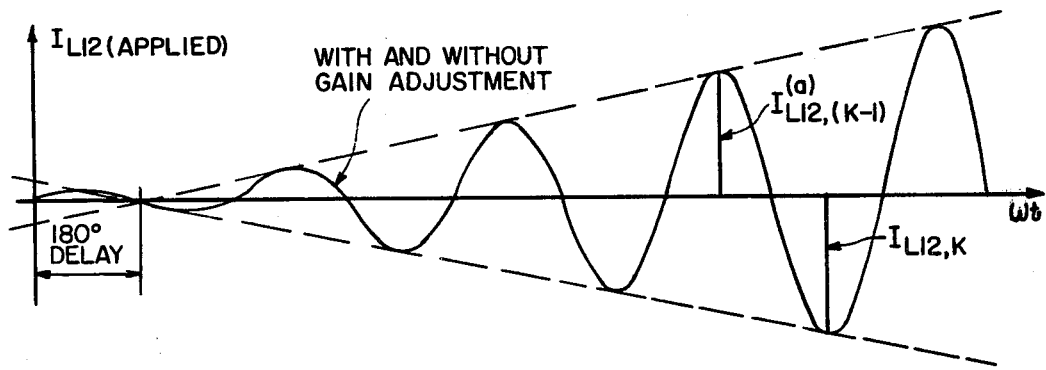
FIG. 6 shows a plot of the actual inductor current applied in the control system of FIG. 3 versus $\omega t$ for relatively slow load disturbances.
Figure 7:
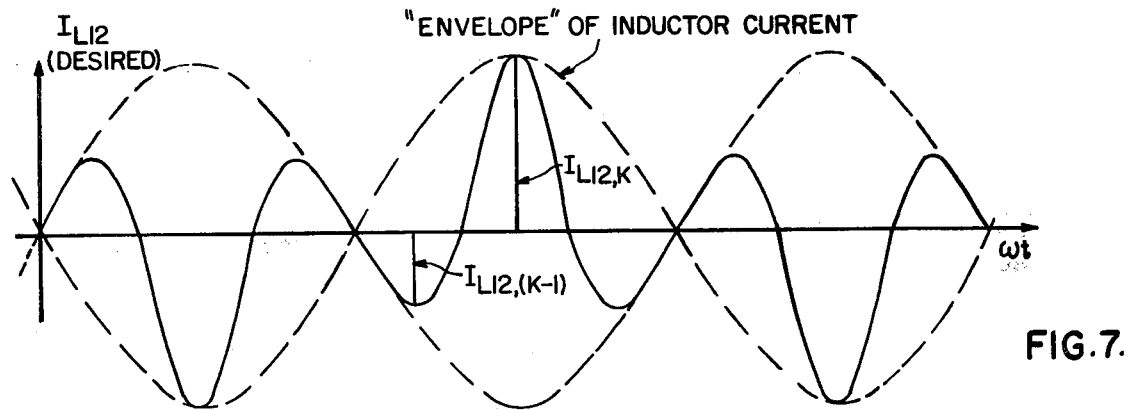
FIG. 7 shows a plot similar to that of FIG. 5 where the load disturbance is relatively fast.

The operation of the gain control proposed is illustrated in FIGS. 5, 6, 7 and 8 where waveforms of the computed and applied fundamental inductor currents are shown. In FIG. 5, the load disturbance and, consequently, the corresponding variation of the desired inductor current are relatively slow with respect to the frequency of the power system. In FIG. 7, the load disturbance and the corresponding variation of the desired inductor current are relatively fast. For both cases, a value of 0.5 is assumed for coefficient c, and 2 for exponent n.

It can be seen in FIGS. 5 and 6 there is practically no gain adjustment in the case of slow disturbance. That is, the applied fundamental inductor current is practically a replica of the computed (desired) one with a phase shift of 180 degrees at the power system frequency. (Recall that the 180 degrees phase delay is an inherent characteristic of the VAR generator being considered).

Figure 8:
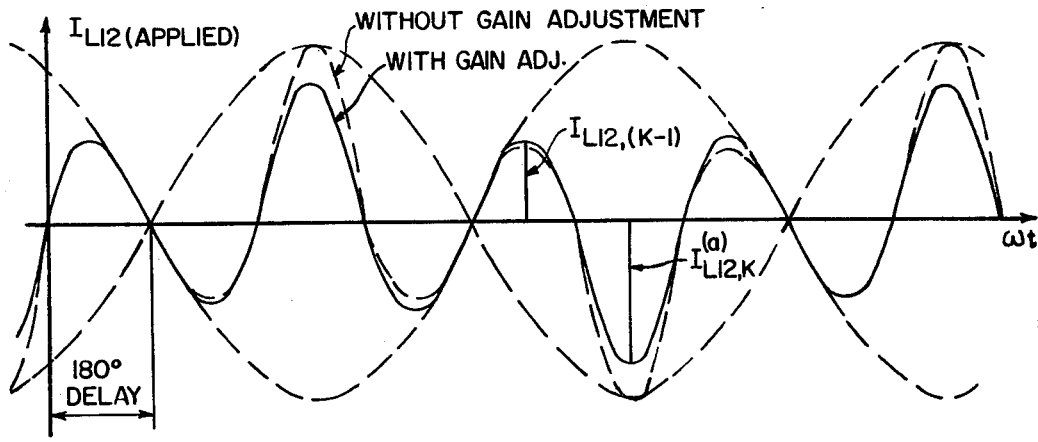
FIG. 8 shows a plot similar to that of FIG. 6 for the control system of FIG. 3 where the load disturbance is relatively fast.

FIGS. 7 and 8 show, on the other hand, that the variation of the applied inductor current is considerably smaller than that of the computed one. In effect, the gain of the VAR generator is reduced for the rapidly changing disturbance. To illustrate the character of the gain reduction, the applied inductor current without gain adjustment is also shown in dashed lines for comparison in FIGS. 5 and 8. This is, of course, a replica of the computed inductor current with 180 degrees phase shift.

The practical implementation of the non-linear gain control is relatively simple. It can be accomplished by inserting a gain adjustment module GA between the control CA and the desired inductor current to firing angle converter ALG as shown in FIG. 3. The purpose of the gain adjustment module or block GA is to convert the computed desired inductor currents, $I_{L12}$, $I_{L23}$, and $I_{L31}$, to the applied inductor currents, $I_{L12}^{(a)}$, $I_{L23}^{(a)}$, and $I_{L31}^{(a)}$, according to the formula given by equation (3).

Referring now to FIG. 9, the modules CA, GA, ALG, TWG and PG of FIG. 3 are depicted with appropriate submodules. This depiction represents the preferred embodiment and best mode of the invention at this time, although it is to be understood that this embodiment and mode is not limiting and that the principles of the present invention may be applied in other embodiments. In this case the calculator CA comprises a current calculator CC. In essence the current calculator CC operates upon the input currents $i_{l1}$, $i_{l2}$ and $i_{l3}$ to provide the computed currents $I_{L12}$, $I_{L23}$ and $I_{L31}$ for the gain adjust module GA. The timing generator TWG which may be of the type shown and described with respect to FIG. 23 of U.S. Pat. No. 3,987,360, (assigned to the assignee of the present invention) operates upon the terminal voltages $v_{T1}$, $v_{T2}$ and $v_{T3}$ to provide reference timing output signals. The interconnection of the various timing signals with other subcomponents of the system will be described hereinafter. The gain adjust module GA which will be described in greater detail hereinafter essentially converts the computed currents $I_{L12}$, $I_{L23}$ and $I_{L31}$ into applied currents $I_{L12}^{(a)}$, $I_{L23}^{(a)}$ and $I_{L31}^{(a)}$ respectfully which are provided to a comparator COMA in the inductor current-to-firing angle converter ALG. The comparison input to the comparator COMA comes from a function of alpha generator FGA while is also contained within the inductor current-to-firing angle generator ALG. The function-of-alpha generator FGA produces the three signals; function of alpha 12 which is written $f(\alpha_{12})$; function of alpha 23 which is written $f(\alpha_{23})$ and function of alpha 31 which is written $f(\alpha_{31})$. The function of alpha signal in each case is compared by the comparator COMA with the appropriate inductor current to provide an output alpha signal $\alpha_{12}$, $\alpha_{23}$, and $\alpha_{31}$ which is routed to the pulse generator PG where the alpha signals are converted to pulses P12, P23 and P31 for routing to the appropriate thyristor sets for phaseback control of the compensator C0. The current calculator CC, the comparator COMA, the function-of-alpha generator FGA and the pulse generator submodule GPD may be of the type shown in FIG. 21 of previously mentioned U.S. Pat. No. 3,999,117. Furthermore, the function-of-alpha generator FGA may be of the type more specifically shown and described with respect to FIG. 25 of the aforementioned U.S. Pat. No. 3,999,117. One set of inputs to the function-of-alpha generator FGA may be voltage signals which are useful in calculating the function of alpha. The timing generator TWG may provide pulsed timing signals along line TM1 to the function-of-alpha generator FGA, along line TM2 to the comparator COMA, and along line TM3 to the pulse generator PG. Furthermore, specific signals S8, S9 and S0 are supplied to the gain adjust module GA in accordance with the timing waveshape diagram shown in the bottom portion of FIG. 11. These more specific timing signals are shown with regard to the gain adjuster circuit GA because of the importance they play in the gain adjustment operation.

Figure 10:
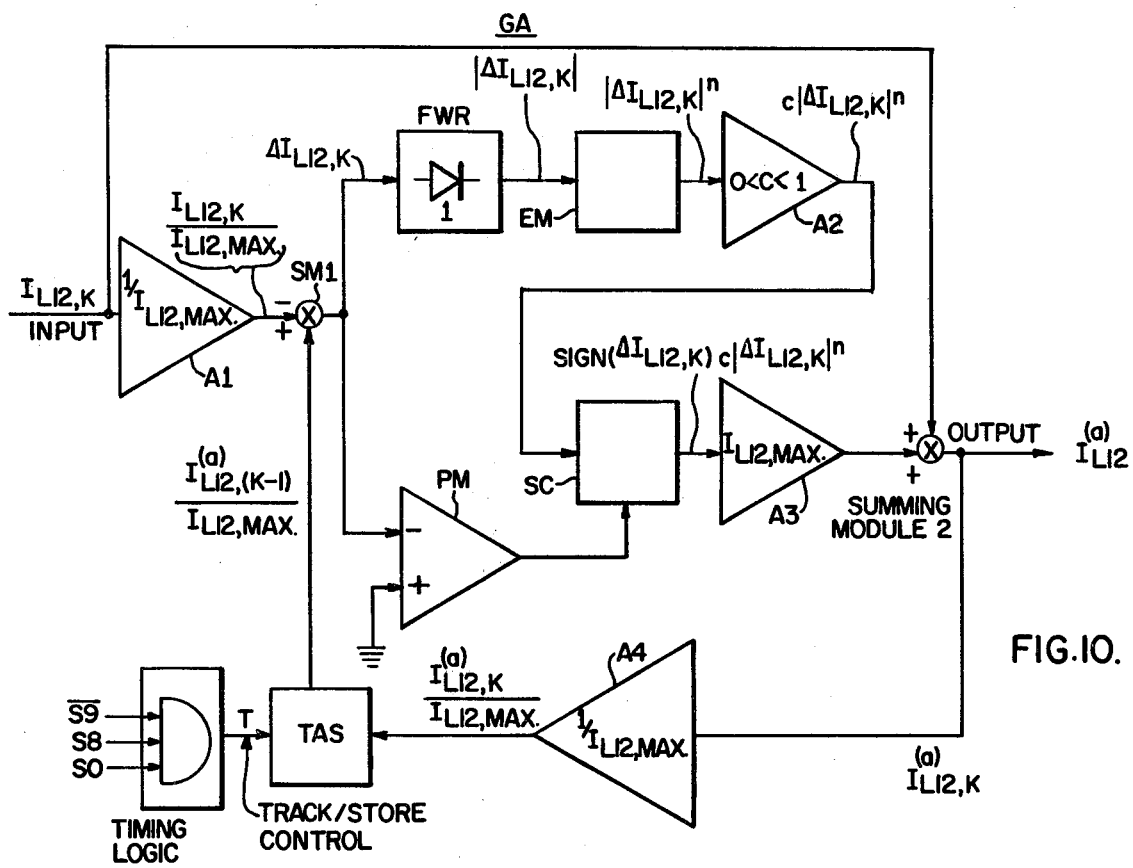
FIG. 10 shows the gain adjust module of FIGS. 3 and 9 separated into subcomponent modules.

A preferred circuit embodiment of non-linear gain adjustment is shown in FIG. 10. Input signal $I_{L12,k}$, representing the presently computed desired inductor current is applied to the input of Amplifier A1. The gain of Amplifier A1 is $1/I_{L12,max}$. Therefore, its output signal becomes the normalized desired inductor current $I_{L12,k}/I_{L12,max}$. The normalized desired inductor current is applied to the negative input of Summing Module SM1. The positive input of Summing Module SM1 is connected to the output of the Track and Store Module TAS. The output signal of the Track and Store Module TAS represents the normalized previously applied inductor current. Therefore, according to equation (1), the output signal of Summing Module SM1 is the normalized difference between the previously applied and presently computed inductor currents, $\Delta I_{L12,k}$. The polarity of the latter signal is positive for decreasing inductor current requests of the phase controlled inductor, and, alternatively, it is negative for increasing inductor currents.

The signal $\Delta I_{L12,k}$ is processed along two separate channels. The first (upper) channel provides the non-linear (exponential) signal which alters the presently computed desired inductor current according to equation (3). The second (lower) signal channel determines whether the change between the present and preceding half cycle was an increase or a decrease and changes the polarity of the signal obtained through the first channel accordingly.

Since the second channel provides the sign control, the non-linear signal processing in the first channel must have predetermined singular polarity to avoid sign ambiguity arising, for example, when the exponential n is not an even integer number. This ambiguity is removed by the Full Wave Rectifier FWR resulting in the absolute value signal $|\Delta I_{L12,k}|$. Note that the sequence (position) of the modules in the upper channel is arbitrary. The absolute value signal $|\Delta I_{L12,k}|$ is fed to the input of the Exponential Module EM. The resulting exponential signal $|\Delta I_{L12,k}|^n$ is scaled (multiplied) by Amplifier A2 which has the fixed gain c. The output signal of Amplifier A2, $c|\Delta I_{L12,k}|^n$, is then applied to the sign changer SC located in the second channel.

In the second channel, the output signal of Summing Module SM1 is applied to the input of the Polarity Monitor PM. Polarity monitoring is implemented in the form of a simple analog comparator referenced to zero (ground) signal level. Ignoring the transitional state, the output of the Polarity Monitor PM has only two states. One state (e.g., high) corresponds to a positive polarity of input signal, the other state (e.g., low), corresponds to negative polarity of input signal. The output of the Polarity Monitor PM controls the Sign Changer SC. Depending on the Polarity Monitor signal, the sign changer SC either lets the output signal of Amplifier A2 pass unchanged or, alternatively, it inverts the signal (that is, it changes its sign). The output of the sign changer SC is a normalized signal. It must be rescaled to an actual level via multiplication by the factor $I_{L12,max}$, as indicated in equation (3). The rescaling is performed by Amplifier A3 with the corresponding gain of $I_{L12,max}$. The output signal $I_{L12,k}^{(\alpha)}$ is then obtained by summing the input signal of Amplifier A1 and the output signal of Amplifier A2.

The normalized previously applied inductor current, which is one of the two terms needed to determine $I_{L12,k}$, is supplied to the positive input of Summing Module SM1 in the following manner. Output signal $I_{L12,k}^{(\alpha)}$, is normalized by Amplifier A4, which, therefore must have a gain of $1/I_{L12,max}$. The normalized presently applied output signal is converted to the normalized previously applied inductor current signal by the Track and Store Module TAS. The track and store control is obtained from a real time timing signal T as will be described. For purposes of simplicity of illustration, the foregoing has been concerned with gain adjustment for current $I_{L12}$ only, it being understood that the same general technique may be utilized with the other two calculated current $I_{L23}$ and $I_{L31}$.

Figure 11:
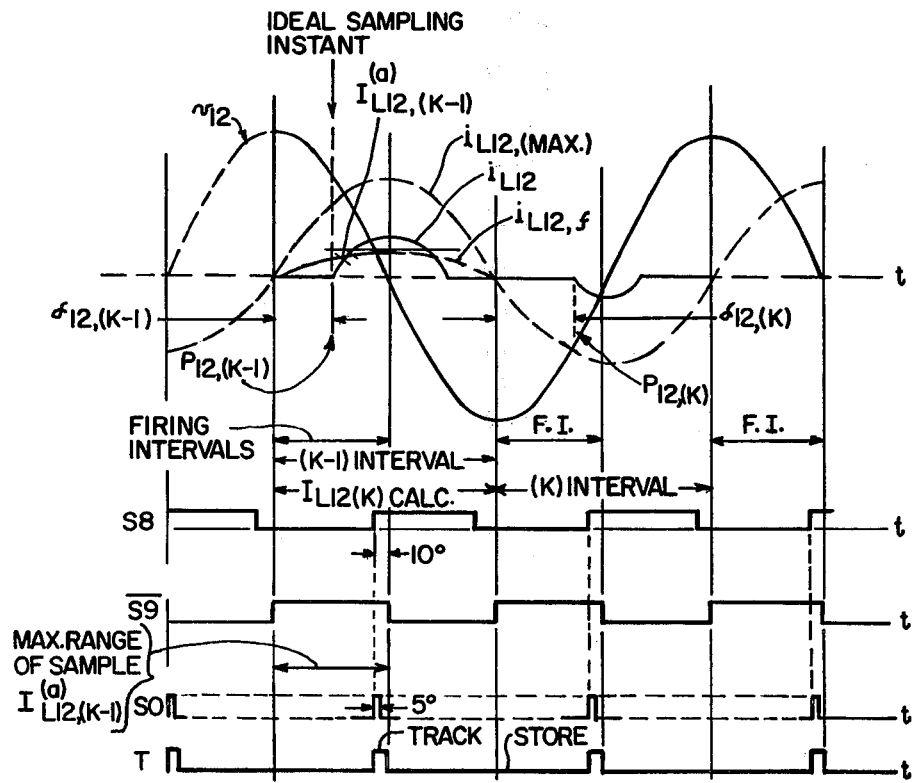
FIG. 11 shows the relationship of the various circuit variables and compensating variables to timing waves for the gain adjusting module of FIG. 10.

By reference to FIG. 11 an even better understanding of the operation of the present invention may be had. FIG. 11 shows a superimposed plot of phase voltage $v_{12}$ and the maximum available inductor current $i_{L12,(max)}$. Furthermore, a k−1 interval and a k interval are shown, it being clear that the k interval immediately follows the k−1 interval. Properties of the VAR generator lead to the following principles. A fundamental compensating current $i_{L12,f}$ with amplitude $I_{L12(k-1)}^{(\alpha)}$ is applied during the k−1 interval to provide a proper predetermined value of volt-amps-reactive (VARS) for compensating disturbances on line 1-2 during the (K−1) interval. In order to obtain a fundamental current $i_{L12,f}$ having a maximum value $I_{L12(k-1)}^{(\alpha)}$ a thyristor controlled phase backed current $i_{L12}$ must be produced during the interval (k−1). This current is produced by firing the appropriate thyristor by providing the pulse $P_{12(k-1)}$ at an angle $\alpha_{12(k-1)}$. According to the present invention, in order to determine the proper amount of compensating current in the next or kth interval, a number of things must occur during at least a portion of the (k−1)th interval. The maximum instantaneous value (amplitude), $I_{L12(k-1)}^{(\alpha)}$, of fundamental current $i_{L12,f}$ must be determined or tracked and stored for subsequent use during the kth firing interval. This is ideally done at or near the instant that the pulse $P_{12(k-1)}$ is applied because it is at this time that the value $I_{L12(k-1)}^{(\alpha)}$ is still known. The latter value may no longer be present because of reset, circuit clearing or memory erasure during the remainder of the k−1 interval. However, for purposes of simplicity, it is presumed that the latter value of applied current may be stored at any time during the maximum range of sampling as is shown in the timing diagram. For practical purposes it is desired to sample the latter current at a time between 10° and 5° prior to the end of the (k−1)th firing interval which occurs when the voltage $v_{12}$ crosses zero. To implement this, the timing signals S8, S9 and S0 are "ANDED" as is best shown in FIG. 10 to produce the timing signal T previously described. During the 5° tracking interval the value of applied current $I_{L12(k-1)}^{(\alpha)}$ is determined or tracked to be stored for use at a later time. Meanwhile, during the (k−1) interval a calculation for a computed current $I_{L12(k)}$ is made much in the way as is described in the prior art. At some time after the calculated current $I_{L12(k)}$ is determined and the previously applied current $I_{L12(k-1)}^{(\alpha)}$ has been tracked and stored, they are both combined in the manner previously described such as by utilizing the apparatus best shown in FIG. 10 to determine the firing angle $\alpha_{12(k)}$ for the k interval. For purposes of convenience of illustration it is presumed that the latter two values of current are joined in the manner described with respect to the previously described material to determine the time at which the pulse $P_{12(k)}$ is to be applied for the k interval. For purposes of simplicity this is shown to occur at the beginning of the firing interval for the angle $\alpha_{12(k)}$ for the k interval of inductor current $I_{L12,(max)}$. However, it is to be understood that depending upon the degree of advancement and sophistication in the calculation of the firing angle $\alpha_{12(k)}$ the time at which the calculated current $I_{L12(k)}$ and the previously applied and stored current $I_{L12(k-1)}^{(\alpha)}$ are combined as described in the foregoing material may extend into the k interval up to the actual time that the pulse $P_{12(k)}$ is actually applied.

It is to be understood with respect to the embodiments of this invention that the apparatus associated with the preferred embodiment of the best mode of the invention is not limiting. It is also to be understood that although many parts of the explanation of the operation of the invention has been described with respect to a single phase of a multi-phase electrical system, that the concepts may be applied to multi-phase electrical systems such as three-phase electrical systems. It is also to be understood that the apparatus embodying the concepts of this invention may be utilized at 50 hz or 60 hz, for example. It is also to be understood that the load LD which is shown for purposes of illustration as a arc furnace in FIG. 3 is not limited thereto. It is also to be understood that the designation of a source voltage though convenient for purposes of illustration is not limiting and that any system in which terminal voltages for the VAR generator can be determined and in which line currents flow may be utilized for VAR generator compensation if that is desired.

The apparatus embodied in the teachings of this invention have many advantages. One advantage lies in the fact that the VAR generator may be used ideally in its best range of operation as determined by a frequency response with an optimal amount of control system gain, but where the control system gain is significantly reduced outside of the range of frequencies at which the system operates in a desirable fashion. To accomplish this the dynamic gain of the VAR generator is automatically and rapidly reduced as the frequency of the load distribution exceeds the VAR generator's useful operating frequency range.

What we claim as our invention is:

1. A VAR generator of the type which is connected to an electrical system for the purpose of supplying reactive power to the electrical system, comprising:
   (a) calculating means for determining an estimated amount of reactive power that is to be provided to said electrical system during a given period of time, said calculating means providing an estimated reactive power output signal which is related to said estimated amount of reactive power;

(b) gain adjust means connected to receive said estimated reactive power output signal from said calculating means, the gain of said gain adjust means being variable to adjust the magnitude of said estimated reactive power output signal to provide a gain adjusted output signal, said variable gain being nonlinearly related to the difference between said estimated amount of reactive power and a stored value which is related of the actual amount of reactive power delivered during a previous time period; and (c) reactive power producing means connected to said electrical system and said gain adjust means for providing reactive power during said time period in correspondence to said gain adjusted output signal.

2. A VAR generator of the type which is connected to an alternating current electrical system for the purpose of monitoring the electrical system current and system voltage to thus provide reactive power to the electrical system during successive half cycles of system voltage, comprising:

(a) a thyristor-controlled-inductor connected in circuit relationship with a fixed capacitor, said later circuit combination being connected in appropriate circuit relationship with said electrical system for supplying said reactive power to said electrical system, the amount of said reactive power supplied during each half cycle of system voltage being a function of the thyristor phase back angle ($\alpha$); and (b) control means connected in appropriate circuit relationship with said electrical system to measure system voltage and current for estimating in a given half cycle of system voltage the amount of inductor current which is apparently necessary to provide a value of reactive power to said electrical system in a succeeding half cycle sufficient to maintain said system voltage and said system current in a generally fixed phase relationship within limits during said succeeding half cycle, said control means also being interconnected with said thyristor-controlled-inductor for providing a gain adjusted output signal thereto for varying said phase back angle ($\alpha$), said gain adjusted output signal being nonlinearly related to the difference between said estimated amount of inductor current and the actual amount of inductor current provided in a previous half cycle.

3. A VAR generator of the type which is connected across two conductors of an electrical system for the purpose of supplying reactive power to the system, comprising:

(a) calculating means connected in circuit relationship with said conductors for estimating the amount of reactive power that is to be provided to said electrical system during a given period of time as a function of a circuit variable and for providing an output signal related to the estimated amount of reactive power;

(b) storage means for storing information related to the amount of reactive power previously provided to said electrical system and for providing an output signal related to the amount of previously provided reactive power;

(c) gain adjustment means interconnected with said calculating means and said storage means, the gain of said gain adjustment means being variable for changing the magnitude of said output signal from said calculating means to thus provide a gain adjusted output signal which is nonlinearly related to the difference between the estimated amount of reactive power determined to be provided during said given period of time and the amount of reactive power previously provided; and (d) VAR generation means interconnected with said electrical system and said gain adjustment means for utilizing said gain adjusted output signal to provide the actual amount of reactive power which to be applied to said electrical system during said given period of time.

4. The combination as claimed in claim 3 wherein said given period of time comprises the time span of one-half cycle of alternating electrical voltage between said two conductors of said electrical system.

5. The combination as claimed in claim 4 wherein said previously provided reactive power is provided in the one-half cycle of said alternating electrical voltage immediately preceding said one-half cycle of said given period of time.

6. A VAR generator of the type which is connected across two conductors of an electrical system for the purpose of supplying reactive power to the system, comprising:

(a) calculating means connected in circuit relationship with said conductors for estimating the amount of reactive power that is to be provided to said electrical system during a given period of time as a function of circuit variables and for providing an output current ($I_{L12,k}$) related to the estimated amount of reactive power;

(b) storage means for storing information related to the amount of reactive power previously provided to said electrical system and for providing an output current ($I_{L12,(k-1)}^{(\alpha)}$) related to the amount of previously provided reactive power;

(c) gain adjustment means interconnected with said calculating means and said storage means, the gain of said gain adjustment means being variable for changing the magnitude of said output current from said calculating means to thus provide a gain adjusted output current ($\Delta I_{L12,k}$) which is nonlinearly related to the difference between the estimated amount of reactive power determined to be provided during said given period of time and the amount of reactive power previously provided; and (d) VAR generation means interconnected with said gain adjustment means for converting said gain adjusted means output current to the actual amount of reactive power which is to be applied to said electrical system during said given period of time.

7. The combination as claimed in claim 6 wherein said given period of time comprises the time span of one-half cycle of alternating electrical voltage between said two conductors of said electrical system.

8. The combination as claimed in claim 7 wherein said previously provided reactive power is provided in the one-half cycle of said alternating electrical voltage immediately preceding said one-half cycle of said given period of time.

9. The combination as claimed in claim 6 wherein said amount of reactive power (VAR) which is applied to said electrical system during said given period of time is defined by the following relationship:

Reactive power is proportional to:

$$\left(\frac{I_{L12,(k-1)}^{(a)} - I_{L12,k}}{I_{L12,MAX}}\right)^n.$$

10. The combination as claimed in claim 7 wherein said alternating electrical voltage has a frequency of 60 Hz.

11. The combination as claimed in claim 7 wherein said alternating electrical voltage has a frequency of 50 Hz.

* * * * *